March 13, 1928. 1,662,313
E. HENRIKSON
PIPE COUPLING TAPPING MACHINE
Filed Dec. 29, 1923 7 Sheets-Sheet 1

Inventor
Emanuel Henrikson
By Chamberlain & Newman
Attorneys

March 13, 1928. 1,662,313
E. HENRIKSON
PIPE COUPLING TAPPING MACHINE
Filed Dec. 29, 1923 7 Sheets-Sheet 3

Inventor
Emanuel Henrikson
By Chamberlain & Newman
Attorneys

March 13, 1928.  1,662,313

E. HENRIKSON

PIPE COUPLING TAPPING MACHINE

Filed Dec. 29, 1923   7 Sheets-Sheet 5

Inventor

*Emanuel Henrikson*

By *Chamberlain & Newman*

Attorneys

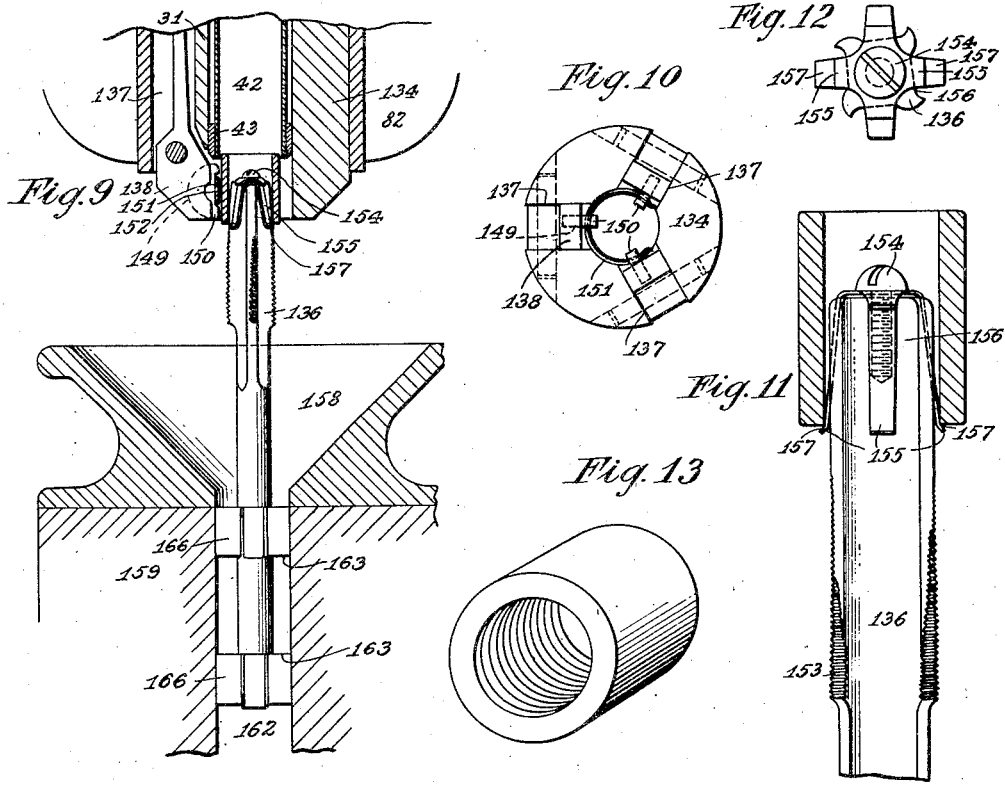

Patented Mar. 13, 1928.

1,662,313

UNITED STATES PATENT OFFICE.

EMANUEL HENRIKSON, OF STRATFORD, CONNECTICUT, ASSIGNOR TO THE BULLARD MACHINE TOOL CO., OF BRIDGEPORT, CONNECTICUT, A CORPORATION OF CONNECTICUT.

PIPE-COUPLING TAPPING MACHINE.

Application filed December 29, 1923. Serial No. 683,362.

This invention relates to a tapping machine and particularly a machine of this character adapted for the internal threading of short lengths of pipe, commonly known as pipe couplings, although it will be understood that it may be employed for the internal threading of other tubular articles, such as nuts or the like.

The object of the invention is to provide a machine which is entirely automatic in operation, and into which the unthreaded pipe couplings may be placed in quantities, and will thereupon automatically pass through the machine and have the internal threads cut therein.

A further object is to provide a machine in which irregularity in structure of the pipe couplings such for instance as eccentricity of the bore will be compensated for, so that in each case the tapped thread will be true.

Another object is to provide means for stopping the operation of the machine when desired, but will only permit the stopping when the tap is in inoperative position, so that the possibility of stopping the machine with the tap engaged in the bore of a coupling will be obviated.

A still further object is to provide a machine unit so designed that a plurality of units may be provided as a battery, and may be connected and driven by the same shafts, thereby conserving space and power, and permitting a single operator to attend to a complete battery of machines.

A still further object is to provide improved oil circulating means by which both the lubricating oil and the cutting oil may be circulated and recirculated throughout the machine.

Another object is to provide means for reversing the operation of the machine, so that both right and left hand threads may be cut.

With the above and other objects in view an embodiment of the invention is shown in the accompanying drawings, and this embodiment will be hereinafter more fully described with reference thereto, and the invention will be finally pointed out in the claims.

In the drawings:

Fig. 9 is an enlarged detail vertical sectional view of the chucking mechanism and showing the tap engaged with the pipe coupling;

Fig. 10 is a bottom plan view of the chucking mechanism;

Fig. 11 is an enlarged detail view showing the tap supporting the pipe coupling to be threaded;

Fig. 12 is a top end view of the tap;

Fig. 13 is a perspective view showing the complete internally threaded pipe coupling;

Fig. 14 is a horizontal sectional view taken along line 14—14 of Fig. 3 and showing the mechanism for releasing the threaded pipe couplings after the same have passed down over the thread cutting segments of the tap; and Fig. 15 is a fragmentary view of the releasing mechanism and showing the same in open position.

Similar reference characters indicate corresponding parts throughout the several figures of the drawings.

Figure 1:
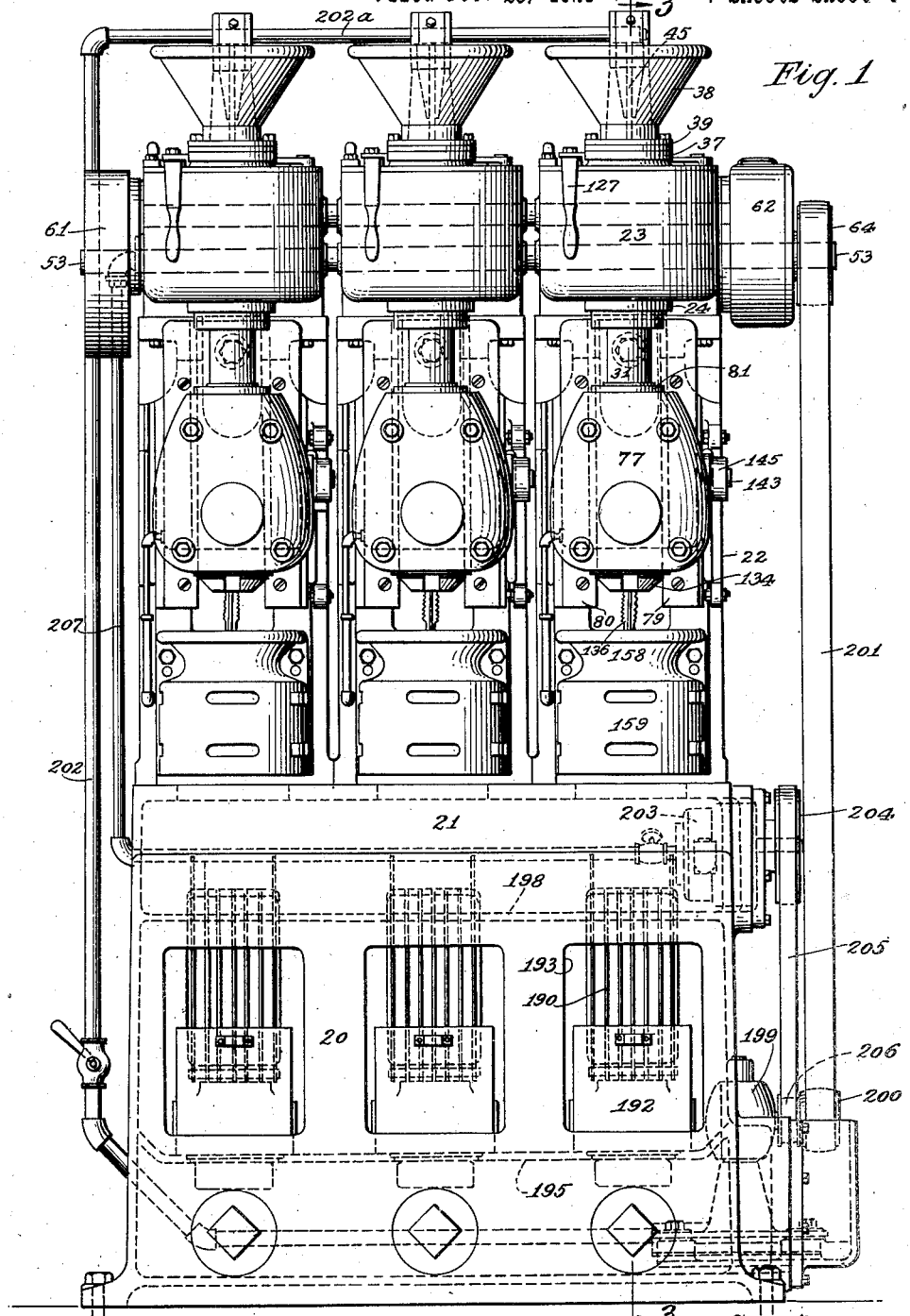
Fig. 1 is a front elevation of a battery of machines according to my invention, this particular embodiment including three machine units.
Figure 2:
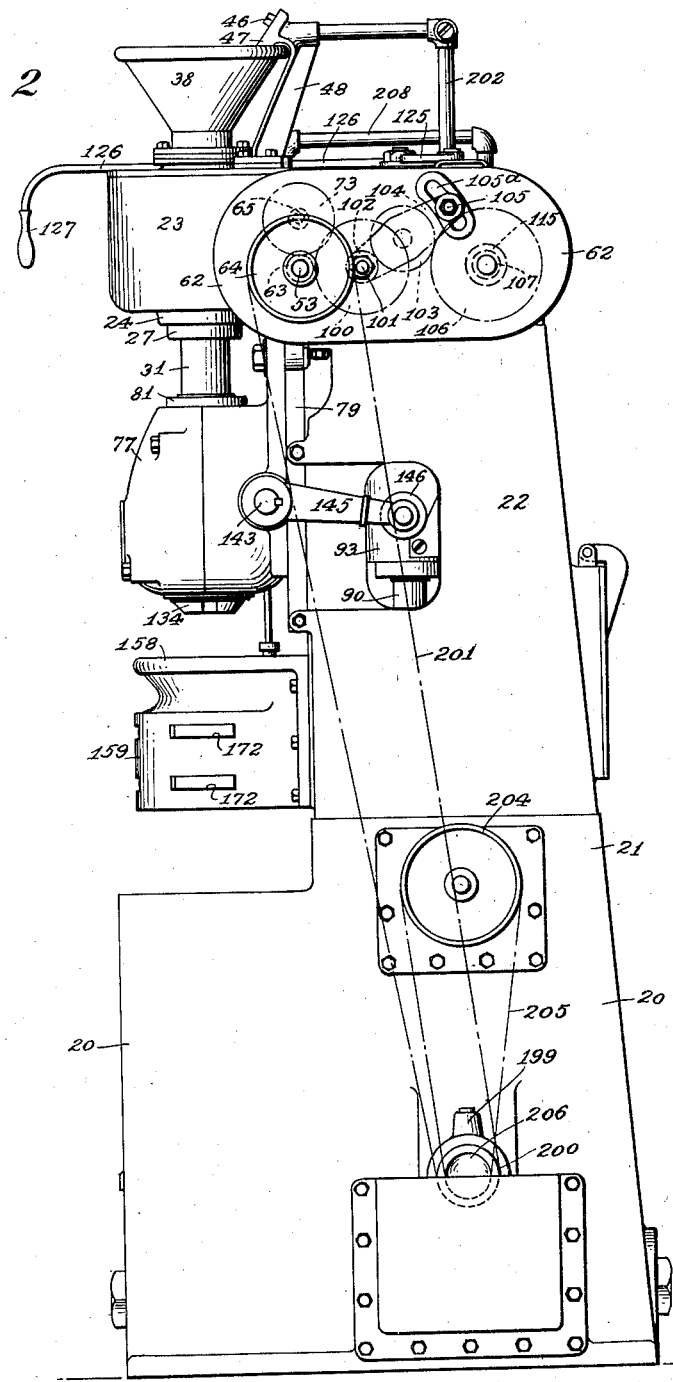
Fig. 2 is a side elevation.

Referring to the drawings and more particularly to Figs. 1 and 2, the machine as preferably constructed comprises a battery of machine units of similar construction arranged side by side, three such units being shown in the present embodiment. These units are mounted upon a single base 20 which for convenience is cast of a suitable length to support the desired number of machine units. This base is of hollow construction and carries means for receiving the completed threaded pipe couplings, which are deposited therein from the several machine units, as will be hereinafter more fully referred to; and it is also provided with an oil reservoir and oil pumps, also hereinafter referred to, for circulating the lubricating and cutting oils. Upon a rear portion 21 of the base the several machine units are supported side by side. For the sake of convenience only one of these will be described in detail, except as regards those parts of the complete battery which co-operatively connect the several units.

The machine units comprise a hollow pedestal 22 bolted to the portion 21 of the base and supporting at its upper end a superstructure 23 secured thereon by bolts and projecting forwardly of the pedestal in overhanging relation above the forward portion of the base 20. A vertically disposed cylindrical bearing boss 24 is provided in the forwardly projecting portion of the head and has rotatably mounted therein the hub 25 of a worm gear 26 disposed within the head. The boss 24 is provided with bushing 27 having a vertical oil groove 28 therein in communication with an oil gland 29 at the underside of the gear 26 and to which oil is conducted through a passage 30. A vertically disposed tubular shaft 31 is engaged within the upper end of the hub 25, and is keyed thereto by means of a key 32, so that rotation of the gear imparts rotary movement to the shaft and at the same time the shaft is adapted to have free longitudinal movement within the hub. The superstructure 23 is provided at the forward portion of its upper side with an opening 33 over which there is bolted a bearing plate 34 having a single tubular bearing boss 35 coaxial with the bearing boss 24 and within which a sleeve 36 is rotatably mounted. The sleeve is provided at its upper end with a flange 37 upon which is bolted the lower flanged end of a hopper 38, an apertured plate 39 being interposed between the flange 37 and the hopper. The wall of the aperture of the plate 39 is annularly recessed as at 40 and has secured therein the upper end 41 of an elongated tubular guide 42 extending downwardly from the reduced outlet of the hopper through the coaxial bores of the sleeve 36 and the shaft 31, and being held in spaced relation to the latter by means of a collar 43 at the lower end of the guide sleeve engaging the bore of the shaft 31 near the lower end.

The sleeve 36 is provided at its lower end with a worm gear 44 adapted upon rotation to impart rotary movement to the hopper 38 and the tubular guide 42. A stationary stirring rod 45 is supported within the hopper at one side for the purpose of causing the pipe coupling blanks in the hopper to be so positioned as to be fed downwardly through the tubular guide 42, the upper end of the rod being slotted and adjustably secured by a screw 46 in the tubular end 47 of a support 48 secured to the plate 34. The end 47 overhangs the upper edge of the hopper and is in the nature of a nozzle for directing the cutting oil into the hopper and downwardly through the guide 42 whereupon it flows into relation with the tap, the oil being fed to the nozzle through a passage 49 from the oil circulating system hereinafter more fully referred to.

The under surface of the plate 34 is inclined downwardly and inwardly to an oil collector ring 50 provided upon the bearing boss 35, and preferably secured thereto by being shrunk thereon, and into which oil condensing on said inclined surface flows, and from which it is carried by a lateral duct 51 to a vertical oil groove 52 in the bore of the bearing.

The main drive shaft 53 is journaled in bearing bosses 54 and 55 at the respective sides of the superstructures 23, tubular bushings 56 and 57 being provided within the bosses which directly engage the shaft. A worm 58 is provided upon the shaft between the bushings and meshes with the worm gear 26, being secured to the shaft by means of a key 59 engaging a key slot 60 extending longitudinally of the shaft. This key slot also serves to conduct oil to the bearings.

At one end the shaft 53 is provided with a driving pulley 61 which may be driven from a suitable source of power while its other end extends through a gear box 62 secured to the side of the superstructure 23, being provided within said box with an elongated driving pinion 63 and provided upon its projecting ends with a pulley 64 adapted as hereinafter more fully pointed out to drive the oil circulating pumps.

Figure 7:
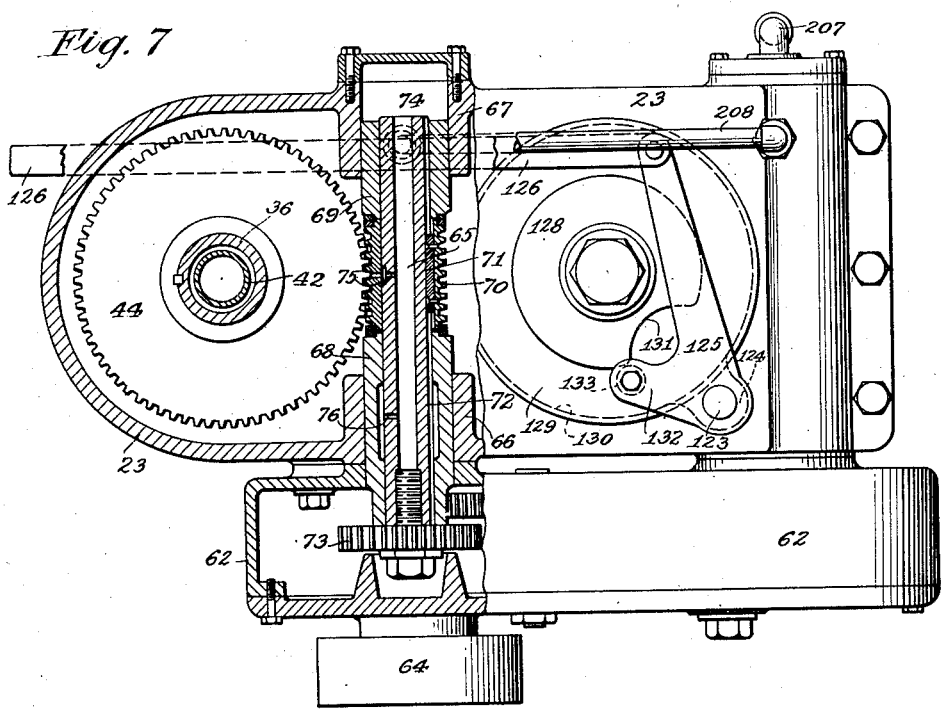
Fig. 7 is a horizontal sectional view taken along line 7—7 of Fig. 3 and showing the clutch operating mechanism.

Above the shaft 53 a tubular shaft 65 is journaled in bearing bosses 66 and 67 (Fig. 7) provided in the side of the superstructure 23, tubular bearings 68 and 69 being provided within the bosses which directly engage the shaft, a worm 70 being secured to the shaft between said bushings by means of a key 71 engaging the elongated key slot 72 of said shaft, and meshing with the worm gear 44 to drive the hopper and the tubular guide 42. A gear 73 is provided upon the end of the shaft 65 within the gear box 62, which meshes with the pinion 63 of the driving shaft 53 and is driven thereby. The other end of the shaft is disposed within an oil chamber 74 to which oil is conducted by the oil circulating system hereinafter referred to, and from which the oil is carried through the bore of the shaft and by ducts 75 and 76 to the exterior of the worm and the journal bearing 68, the journal bearing 69 being lubricated by oil passing into the key slot 72.

Figure 8:
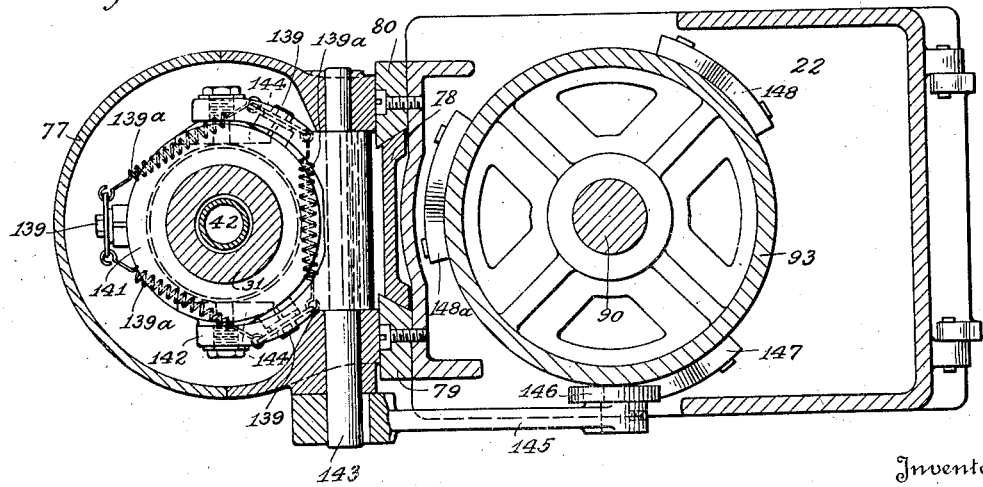
Fig. 8 is a horizontal sectional view taken along line 8—8 of Fig. 3, and showing the chucking mechanism for the pipe coupling.

At the lower end of the shaft 31 there is provided a reciprocating head 77 (Figs. 4 and 8) having a dove-tailed rib 78 slidably engaged between guide plates 79 and 80 secured to the forward side of the pedestal 22. The shaft is rotatable within the head and is adapted to be raised and lowered by the reciprocating movements of the head, and for this purpose is provided with a collar 81 threaded thereon above the cylindrical bearing portion 82 of the head, gaskets 83 and 84 being interposed beneath said collar. The bearing 82 is provided with a bushing 85 having a flange 86 formed at its lower end which engages one side of the bearing portion 82, said flange being engaged by a gasket ring 87 secured to the shaft at 88.

Figure 5:
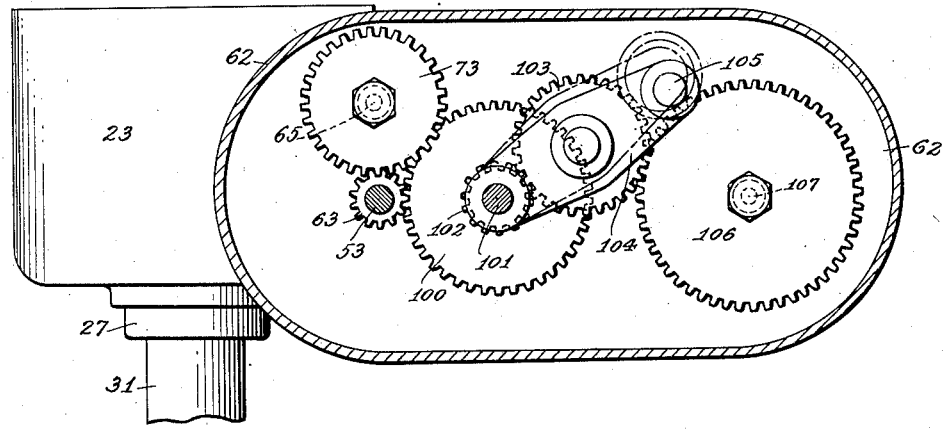
Fig. 5 is a vertical sectional view taken along the line 5—5 of Fig. 6 and showing the gear train and reversal mechanism for driving between the main drive shaft and the mechanism for chucking and moving the pipe coupling into relation with the tap.
Figure 6:
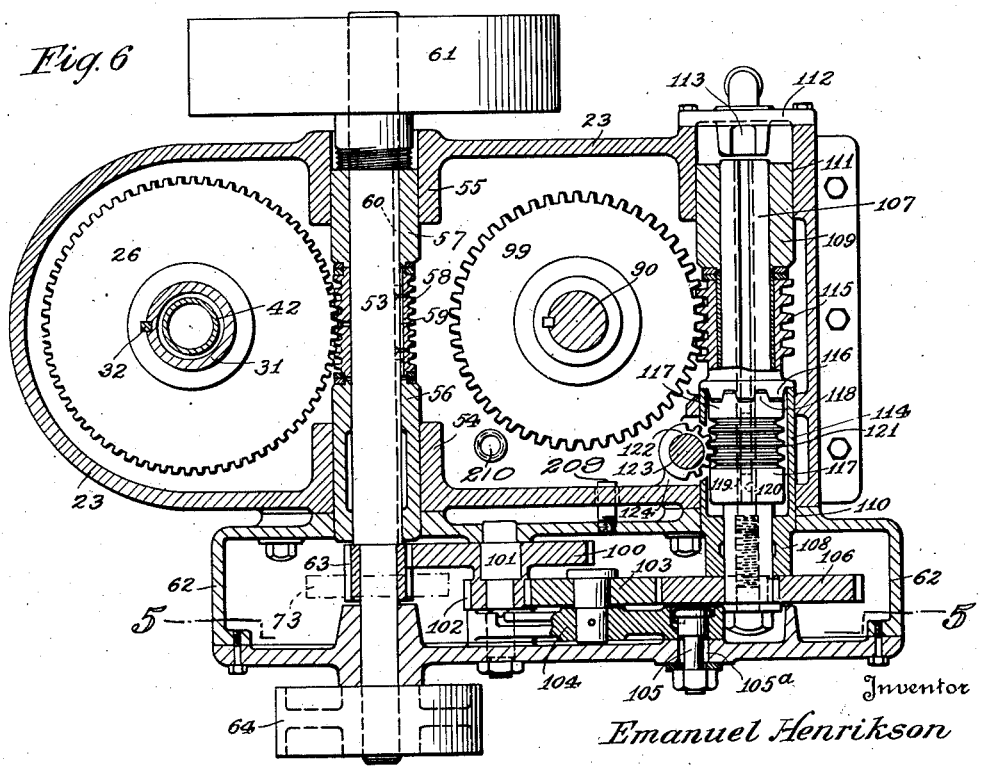
Fig. 6 is a horizontal sectional view taken along line 6—6 of Fig. 3 and showing the reversal mechanism and clutch.

The mechanism for reciprocating the head 77 comprises a vertical shaft 90 journaled in bearings 91 and 92 provided respectively in the lower portion of the superstructure 23 and at the lower portion of the pedestal 22, and having mounted thereon a cam drum 93, provided with a cam groove 94, engaged by a roller 95 at the end of a stud shaft 96 secured at the upper projecting portion 97 of the head 77, and extending through a slot 98 in the front portion of the pedestal. Above the bearing 91 the shaft is provided with a worm gear 99 adapted to be driven from the drive shaft 53 through gearing disposed in the gear box 62, and comprising a large gear 100 provided upon a short shaft 101 and meshing with the pinion 63, the gear 100 having a pinion 102 formed integral therewith and which meshes with a gear 103 provided intermediate the ends of a lever 104 pivotally mounted at one end upon the shaft 101 and provided at its other end with a stud bolt 105 engaging an arcuate slot 105ª in the side of the gear box. In the position of the lever (Fig. 5) with the stud bolt at the lower end of the slot 105ª the gear 103 meshes directly with a large gear 106 at the end of a tubular shaft 107 journaled in bearings 108 and 109, the bearing 108 being mounted in an opening 110 in the contiguous side walls of the superstructure 23 and the gear box, while the bearing 109 is mounted in a bearing boss 111 formed in the other side wall of the superstructure and forming an oil chamber, a cover plate 112 having an inlet 113 being secured at the outer side of the boss for this purpose.

The bearing 108 is provided with a cylindrical extension 114 and between the end of this extension and the bearing 109 a worm 115 is loosely mounted on the shaft 107 and meshes with the worm gear 99, its end adjacent the extension being provided with clutch teeth 116 extending into the same. Within the extension there is provided a clutch 117 having clutch teeth 118 adapted to be engaged and disengaged with teeth 116, and being connected to shaft 107 by a key 119 slidably engaged in the key slot 120 of the shaft.

The clutch is provided with annular rack teeth 121 engaged by a segment 122 provided upon the lower end of a vertical shaft 123 journaled in suitable bearings 124 provided in the superstructure 23 and having at its upper end a lever arm 125, to the end of which a pull rod 126 is secured, and which extends to the front of the machine where it is provided with a handle 127. By operating this pull rod the segment 122 will be turned and the clutch moved into and out of relation with the worm so that the rotation of the shaft 90 may be started and stopped as desired.

In order to prevent stopping when the parts are in such position that the tap is engaged with a pipe coupling and to permit stopping only when the tap is disengaged, a safety device is provided, consisting of a cam disk 128 mounted at the end of the shaft 90 and above an apertured cover plate 129 disposed over an opening 130 of the superstructure and through which said shaft extends. The cam disk is provided in its periphery with a cut-out 131, the lever 125 being provided upon an extended portion 132 thereof with roller 133 which engages the periphery of the cam. The cut-out being so situated that it only comes into relation with the roller when the parts are in such position that the tap is disengaged from the pipe coupling, the circumferential surface of the cam preventing operation of the clutch to stopping position at all other times.

The shaft 31 is provided at its lower end with an enlarged chucking portion 134, having bearing in the lower apertured portion 135 of the head 77, and extending below the end of the guide 42 to provide a space into which the upper end of the tap 136 extends, the tap being supported at its lower or shank end by mechanism hereinafter more fully described. The chucking portion 134 is provided with a plurality (three as shown) of radial slots 137 extending at their lower ends into the space below the guide tube 42 and provided with pivotally mounted gripping fingers 138 adapted to be projected at their lower ends into said space to grip the pipe coupling blanks. At their upper ends the fingers are provided with spring-pressed plungers 139 adapted to be depressed outwardly, the upper ends of the fingers being drawn inwardly toward the shaft 31 by means of coil springs 139ª connected between them. The plungers are adapted to be engaged by cam pieces 140 slidably engaged in the upper portions of the slots 137, and secured to and depending from a channel ring 141 mounted upon the shaft 31, and adapted to have longitudinal sliding movement thereon to engage and disengage the cam pieces behind the plungers and thereby operate the fingers so that they grip and release the pipe coupling blanks. In order to raise and lower the ring 141 a yoke member 142 is mounted upon a shaft 143 journaled in the head 77, and is provided at its ends with rollers 144 engaging the channel of the ring at diametrically opposite points. At one end of the shaft there is secured a lever arm 145 extending into relation with the cam drum 93 and provided at its end with a roller 146 adapted to be successively engaged by lifting and depressing cams 147, 148 and 148ª in both the raised and lowered positions of the head 77 to cause the ring 141 to be lowered, thereby moving the fingers to gripping position while the head is raised and to raise the ring to move the fingers to open position while the head is lowered. At their gripping ends the fingers are provided with semi-circular pockets 149 in which blocks 150 are inserted and held in place by a split spring ring 151 engaged in a recess 152 provided in the straight edges of the blocks. This construction in co-operation with spring plungers 139 permits the fingers to firmly grip the pipe coupling blanks irrespective of any irregularity in the outer surface such as eccentricity or longitudinal taper, and at the same time causes the bore to be centered relative to the tap. This is essential in order to obtain accurate and uniform thread.

The tap 136, which is provided with the usual thread cutting segments 153 is provided at its upper end with a spring member secured in place by a screw 154, and having a plurality of arms 155 extending downwardly and outwardly in slots 156 formed in the end of the tap, the arms being deflected outwardly at their ends as at 157 and projecting from the slots. Prior to being gripped by the chuck fingers and then turned downwardly upon the tap to have threads cut therein, the pipe coupling blanks are engaged upon the spring arms 155, being supported upon the deflected ends 157 as shown in Fig. 11, and are thereby accurately positioned relative to the tap.

Figure 4:
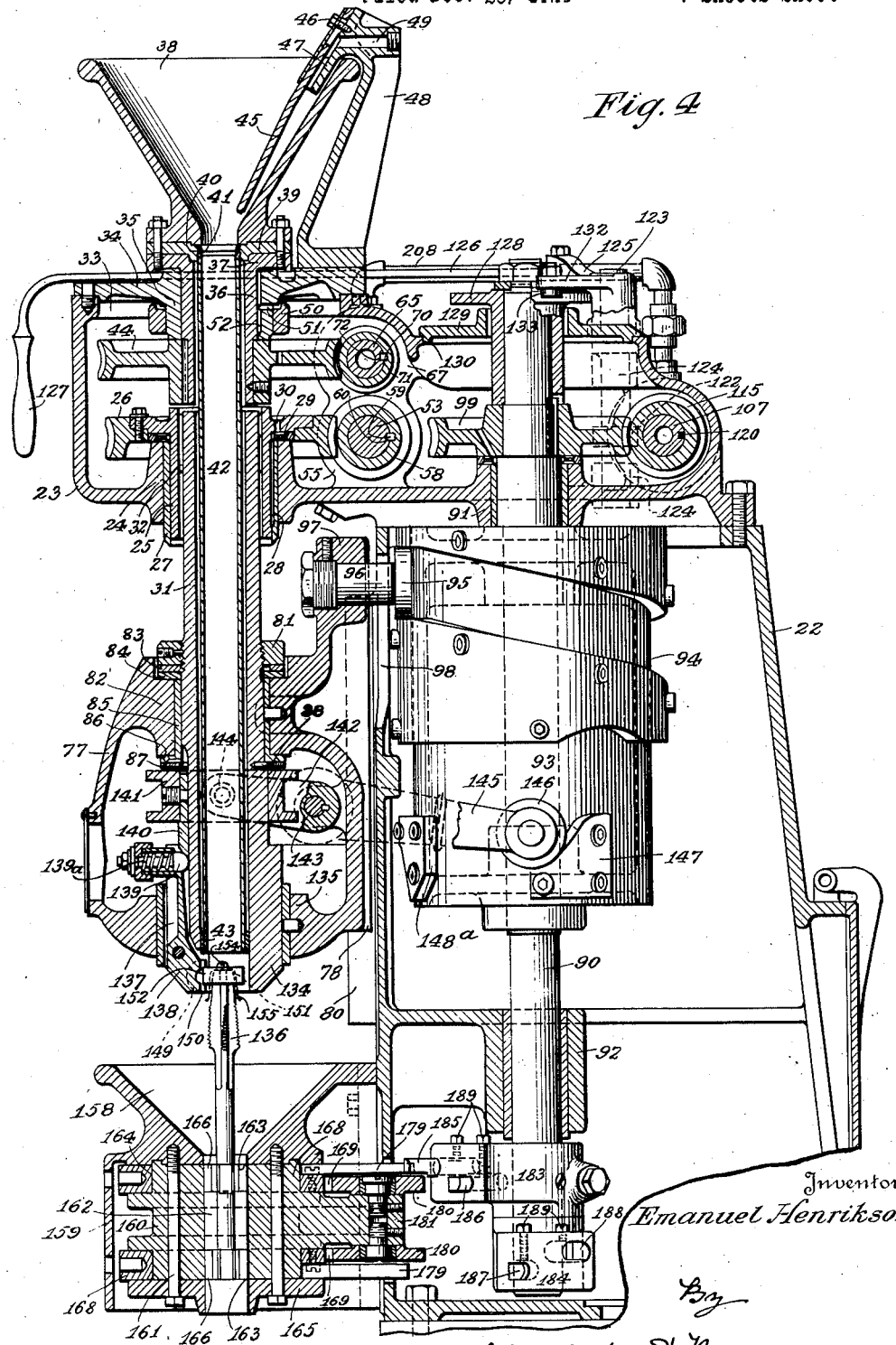
Fig. 4 is an enlarged vertical sectional view of the upper portion of the machine, certain parts shown in elevation in Fig. 3 being shown in vertical section in this figure.

At this point in the operation the chuck head 77 is in the raised position indicated in Fig. 4 and the chuck is being continuously rotated through rotation of the shaft 31. The hopper and guide tube 42 are likewise continuously rotated and the stirring action of the rod causes the pipe coupling blanks to be fed into the guide tube so that a plurality of them are stacked therein. The cam 147 now engages the roller 146 of the lever 145, depressing the channel ring 141 so that the cam pieces 140 are inserted and held beneath the spring plungers 139 and the gripping fingers are closed into gripping relation with the pipe coupling blank, so that the same is rotated by the chuck. The chuck begins to lower through engagement of the roller 95 with the decline of the cam 94 and the blank is forced over the spring arms 155 and into relation with the cutting segments of the tap, the coupling being then turned downwardly on the same until it passes below and free of the segments. During this action the upper end of the tap is moved into the bore of the next coupling blank, which is supported on the spring arms 155 preparatory to the chuck being raised and the gripping and threading operation repeated on said next blank. As soon as the coupling moves beneath the cutting segments the cam 148 engages the roller 146 of the lever 145 and the channel ring 141 is raised thereby releasing the coupling from its engagement by the chuck fingers. It thereupon drops downwardly upon the shank of the tap and by operation of the releasing mechanism which supports the tap, and which will now be described, is allowed to pass downwardly and free of the end of the tap.

Beneath the chuck and secured to the front wall of the pedestal 22 there is provided a support for the tap comprising a dished upper portion 158 and a depending skirt portion 159 which surrounds a member 160 secured by bolts 161 to the underside of the portion 158, and having a central vertical passage 162 therein, the diameter of which is such as to permit the pipe couplings to pass downwardly therethrough. At both its upper and lower ends the member 160 is provided with diametric slots 163 and an annular recess 164, the under side of the portion 158 forming an upper wall for the upper slot and recess while an apertured disk 165 is secured to the under side of the member 160 to form a lower wall for the lower slot and recess. The slots are provided at each side of the passage 162 with slides 166, the opposed inner ends of which are provided with rectangular recesses 167 forming jaws which in the inwardly moved portion of the slides, grip the square shank of the tap to support the same. Within each of the annular recesses 164 there is provided a ring 168 having a toothed segment 169 and which upon partial rotation is adapted to project and retract the slides. For this purpose the rings are provided at each side and adjacent the outer end of the slides with a recess or cut-out 170 at the inner side and in which is disposed the recessed and slotted end 171 of the slide, the skirt portion 159 of the member 158 being slotted as at 172 to receive the outer ends of the slides in their projected position. The outer wall 173 of the slot 171 is inclined and slightly curved while the inner wall 174 is angular, the outer wall being disposed within the cut-out 170 of the ring, while the peak of the inner wall engages the inner periphery of the ring. The ring is provided within its cut-out portion with a pin 175 while the inner periphery is provided with a recess 176 having one end wall 177 diagonally disposed, and adjacent the end of this wall a set screw 178 is provided to form an adjustable bearing point to normally engage the peak of the wall 174 of the slide.

Upon counter-clockwise movement of the ring the pin 175 engages the surface 173 moving the slide outwardly and out of engagement with the tap, to provide a free opening through the passage 162, the wall 174 of the slide moving into the recess 176 as shown in Fig. 15. The clockwise movement of the ring causes the wall 177 of the recess to engage the inclined wall 174 of the slide in a manner to move the same inwardly to gripping position, the said screw 178 engaging the peak of the wall 174 in such inner position to retain the slide in gripping relation with the tap.

Figure 3:
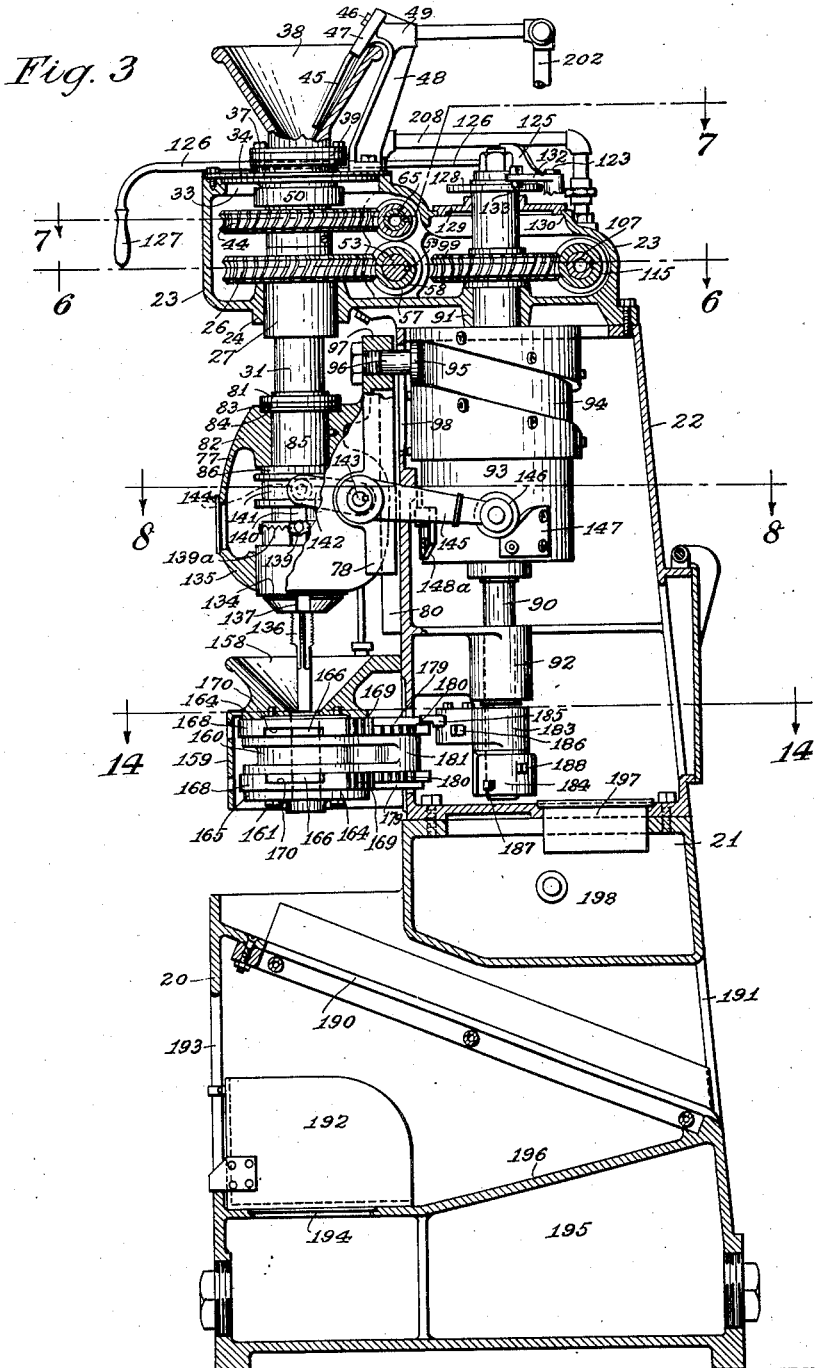
Fig. 3 is a vertical sectional view taken on the line 3—3 of Fig. 1.

The mechanism for rotating the ring to and fro comprises a radial arm 179 secured to the ring and a toothed segment 180 rotatably mounted upon a projection 181 of the member 160 and meshing with the teeth 169 of the ring, and being provided with an outwardly projecting tooth portion 182. Upon the lower end of the shaft 90 there are clamped in angular relation a pair of radial supports 183 and 184, in which projecting fingers 185 and 186 and 187 and 188 are adjustably secured by means of set screws 189, and are adapted during rotation of said shaft to respectively engage the upper arm 179, the upper tooth 182, the lower arm 179 and the lower tooth 182, this operation occurring immediately after the pipe coupling leaves the cutting segments of the top. The engagement with the upper arm 179 rotates the upper ring in counterclockwise direction, the toothed segment 180 being rotated to the dotted line portion (Fig. 3) thereby permitting the coupling to pass along the shank beneath said slides; whereupon the upper tooth 182 is engaged, rotating the segment 180 and turning the ring in clockwise direction to again move the slide to gripping position. The lower slides are then operated in a similar manner opening to permit the coupling to pass off of the end of the shank and closing to again grip the shank.

The completed couplings drop from the tap upon an inclined grid 190 supported in the base 20 and along which they roll through an opening 191 into a suitable receptacle.

The metal particles produced by cutting the thread fall through the grid into a bin 192, which bin may be removed periodically through an opening 193 to empty its contents. The bottom of the bin is in the form of a sieve that rests above an opening 194 in the upper wall of a reservoir 195 adapted to receive the cutting oil, which is continually circulated downwardly through the guide 42 and through the passage 162 to the reservoir. The upper wall 196 of the reservoir is inclined downwardly to the opening 194 to facilitate the flow.

The lubricating oil having passed over the various bearings, gears, etc., flows through a sieve 197 in the base of the pedestal 22 into a reservoir 198.

An oil pump 199 (Fig. 1) is provided in the reservoir 195, its pulley 200 being driven by a belt 201 from the pulley 64, the oil being fed upwardly from the pump through a pipe 202 to the nozzle 47 projected into the hopper 38.

A pump 203 for the lubricating oil is provided in the reservoir 198, its pulley 204 being driven by a belt 205 from a pulley 206 provided on the shaft of the pump 199.

A pipe 207 extends from the pump to the oil inlet 113 of the oil chamber at the end of the tubular shaft 107, the oil flowing through the shaft by ducts to the bearings and worm gearing.

The oil chamber is connected by a branch pipe 208 to the oil chamber 74 at the end of the tubular shaft 65, the oil passing through this shaft to the bearings and gears and dropping upon the lower drive shaft 53. The oil which collects in the gear box after being fed therein through the tubular shaft then passes by a tube 209 into the superstructure 23 and from an outlet 210 therein downwardly through the pedestal 22 to the reservoir 198. The circulation of the lubricating and cutting oils is both complete and automatic and reaches every moving part of the machine.

The machine as described is adapted to cut right hand threads. In order to cut left hand threads a left hand tap is substituted and the direction of rotation of the chuck shaft 31 reversed through reversing the direction of rotation of the drive shaft 53. The mechanism for raising and lowering and opening and closing the chuck and operating the tap releasing and gripping slides, must continue to rotate in the same direction, and for this purpose the lever 104 is swung to its upper position, the stud bolt 105 being loosened, and an intermediate gear 220 is journalled upon the end of the lever between the gear 103 and the gear 106, the gear 103 being moved out of mesh with the gear 106. This gear train is indicated in dotted lines in Fig. 5.

Any desired number of machine units may be mounted side by side upon a single base as indicated in Fig. 1, where three such units are shown. With this arrangement the three main shafts 53, 65 and 107 extend through and are common to the several machine units, the gear train at the outer side of the end machine operating between the several shafts while the driving pulley of the shaft 53 is at the outer side of the other end machine unit. The oil circulating system for both the cutting and lubricating oils is common to the several machine units, the pipe 202 being provided with an extension 202ª extending to the nozzles 47 of the several units.

I have illustrated and described a preferred and satisfactory embodiment of my invention, but it is obvious that changes may be made therein, within the spirit and scope thereof, as defined in the appended claims.

Having thus described my invention, what I claim and desire to secure by Letters Patent is:

1. In a tapping machine, a vertically disposed stationary tap, a rotary chuck for blanks to be tapped, means on said tap for supporting a blank preparatory to engagement by said chuck, means for feeding blanks into contiguous relation with said chuck, means for moving said chuck into and out of relation with said tap whereby said blanks are successively engaged with said chuck and successively threaded, and means for supporting the shank of said tap comprising spaced gripping means, and means adapted to successively disengage said gripping means whereby the blank will pass over said shank after threading.

2. In a tapping machine, a support, a superstructure on said support, a vertically disposed stationary tap supported below its tapping end, a chuck head mounted for vertical movement on said support, a rotary chuck carried by said chuck head, means on said tap for supporting a blank preparatory to engagement by said chuck, means on said superstructure for continuously rotating said chuck, means in said superstructure for feeding blanks by gravity to said chuck, and means for reciprocating said chuck relatively to said tap.

3. In a tapping machine, a tap, a rotary chuck for blanks to be tapped, tubular feed means for feeding blanks into relation with said chuck and about which said chuck is rotatable, a cam shaft, cam means on said shaft for opening and closing said chuck, and cam means on said shaft for imparting longitudinal reciprocations to said chuck whereby said blank is threaded by said tap.

4. In a tapping machine, a tap, a chuck for blanks to be tapped, tubular feed means for feeding blanks into relation with said chuck and about which said chuck is rotatable, gearing for rotating said chuck, a cam shaft, cam means on said shaft for opening and closing said chuck, cam means on said shaft for imparting longitudinal reciprocations to said chuck whereby said blank is threaded, and gearing between said first mentioned gearing and said cam shaft for rotating the latter.

5. In a tapping machine, a vertically disposed tap, a vertical rotary chuck for blanks to be tapped, a vertical shaft for said chuck, tubular feed means for feeding blanks into relation with said chuck and about which said chuck is rotatable, a horizontal drive shaft, worm gearing between said horizontal drive shaft and said vertical shaft, a vertical cam shaft, cam means on said shaft for opening and closing said chuck, cam means on said shaft for imparting longitudinal reciprocations to said chuck whereby said blank is threaded, a second horizontal shaft driven by said first horizontal shaft, and worm gearing between said second horizontal shaft and said cam shaft for driving the latter.

6. In a tapping machine, a tap, a chuck for blanks to be tapped, drive means for rotating said chuck, mechanism adapted to be driven by said drive means for opening and closing said chuck, and imparting relative longitudinal movement between said chuck and tap and change gearing between said drive means and mechanism whereby the directions of rotation of said chuck relatively to said mechanism may be changed.

7. In a tapping machine, a tap, a rotary chuck for blanks to be tapped, a rotary hopper coaxial with said chuck for feeding blanks to said chuck, a shaft for driving said chuck, a shaft for driving said hopper geared to said first shaft to be driven at a different speed from said first shaft, one of said shafts being a driving shaft and the other a driven shaft, and mechanism driven by said drive shaft for opening and closing and imparting relative longitudinal movement between said chuck and tap whereby the blank is threaded.

8. In a tapping machine, a tap, a rotary chuck for blanks to be tapped, a rotary hopper coaxial with said chuck for feeding blanks to said chuck, a worm gear for said chuck, a worm gear for said hopper, worm shafts for said worm gears, transmission gearing between said shafts adapted to effect different driving speeds, one of said shafts being a driving shaft and the other a driven shaft, and mechanism driven by the driving shaft for opening and closing said chuck and imparting relative longitudinal movement between said chuck and tap whereby the blank is threaded.

9. In a tapping machine, a tap, a rotary chuck for blanks to be tapped, driving means for said chuck, mechanism driven by said driving means for opening and closing and imparting relative longitudinal movement between said chuck and tap, clutch means adapted to be operated to connect and disconnect said mechanism and said drive means, and means adapted to prevent operation of said clutch means, except when said chuck and tap are in non-tapping relation.

10. In a tapping machine, a tap, a rotary chuck for blanks to be tapped, driving means for said chuck, mechanism driven by said driving means for opening and closing and imparting relative longitudinal movement between said chuck and said tap, clutch means adapted to be operated to connect and disconnect said mechanism and said drive means, means for operating said clutch, and a cam having movement with said mechanism and adapted to prevent operation of said last named means except when said chuck and tap are in non-tapping position.

11. In a tapping machine, a tap, a rotary chuck for blanks to be tapped comprising a chuck head, a rotatable tubular shaft within said head, a plurality of radial fingers upon said shaft and fixed against longitudinal movement relatively to said shaft, means for moving said fingers into and out of gripping relation with respect to the diameter of the bore of said shaft, means within the bore of said shaft for feeding blanks into relation with said chuck, and means for imparting relative longitudinal movement between said chuck and tap whereby the blank is threaded.

12. In a tapping machine, a tap, a rotary chuck comprising a chuck head, a rotatable tubular shaft within said head, a plurality of radial fingers upon said shaft and fixed against longitudinal movement relatively to said shaft, cam means movable longitudinally of said shaft adapted to be engaged and disengaged with said fingers to move them into and out of gripping relation with respect to the diameter of the bore of said shaft, means within the bore of said shaft for feeding blanks into relation with said chuck, and means for imparting relative longitudinal movement between said chuck and tap whereby the blank is threaded.

13. In a tapping machine, a tap, a rotary chuck comprising a chuck head, a rotatable tubular shaft within said head, a plurality of radial fingers upon said shaft provided at one end with gripping means and at their other ends with yieldable contact means and fixed against longitudinal movement relatively to said shaft, cam means movable longitudinally of said shaft adapted to be engaged and disengaged with the contact ends of said fingers to move their gripping ends into and out of gripping relation with respect to the diameter of the bore of said shaft, means within the bore of said shaft for feeding blanks into relation with said chuck, and means for imparting relative longitudinal movement between said chuck and tap whereby said blank is threaded.

14. In a tapping machine, a tap, a rotary chuck comprising a chuck head, a rotatable tubular shaft within said head, a plurality of radial pivotal fingers upon said shaft provided at one end with gripping means and fixed against longitudinal movement relatively to said shaft, spring means connected between the other ends of said fingers, cam means movable longitudinally of said shaft adapted to be engaged and disengaged with said spring connected ends to move the gripping ends into and out of gripping relation with respect to the diameter of the bore of said shaft, means within the bore of said shaft for feeding blanks into relation with said chuck, and means for producing relative longitudinal movement between said chuck and tap whereby said blank is threaded.

15. In a tapping machine, a tap, a rotary chuck comprising a chuck head, a rotatable tubular shaft within said head, a plurality of radial gripping members fixed against longitudinal movement relatively to said shaft, gripping means carried by said members and adapted to have rotary movement in a vertical plane relatively to said gripping members and having a gripping edge adapted by said movement to accommodate itself to the surface of the blanks, means for moving said gripping members into and out of gripping relation with respect to the diameter of the bore of said shaft, means within the bore of said shaft for feeding blanks into relation with said chuck, and means for producing relative longitudinal movement between said chuck and tap whereby said blank is threaded.

16. In a tapping machine, a tap, a rotary chuck comprising a chuck head, a rotatable tubular shaft within said head, a plurality of radial gripping members provided with semi-circular pockets, semi-circular gripping blocks mounted in said pockets, a split-spring-ring adapted to retain said blocks in said pockets, means for moving said gripping members into and out of gripping relation with respect to the diameter of the bore of the shaft, means within the bore of said shaft for feeding blanks into relation with said chuck, and means for producing relative longitudinal movement between said chuck and tap whereby said blank is threaded.

17. In a tapping machine, a tap having tapping threads spaced from its upper end, a chuck coaxial with the tap, a tubular guide for supplying blanks to said chuck, means for imparting relative longitudinal movement between said chuck and tap whereby the blank is threaded, spring means on said tap above said tapping threads adapted to engage and support the lowermost blank in said guide during the tapping of a blank, and to support said lowermost blank in chuck engaging position, said spring means adapted to release said blank upon said relative longitudinal movement between said chuck and tap.

18. In a tapping machine, a tap having tapped threads spaced from its upper end, a chuck coaxial with the tap, a tubular guide for supplying blanks to said chuck, means for imparting relative longitudinal movement between said chuck and tap whereby the blank is threaded, a plurality of radially disposed depressible spring fingers mounted on said tap above said tapping threads adapted to engage and support the lowermost blank in said guide during the tapping of a blank, and to support said lowermost blank in chuck engaging position, said spring fingers adapted to be depressed to release said blank upon said relative longitudinal movement between said chuck and tap.

19. In a tapping machine, a tap having tapping threads spaced from its end, a chuck coaxial with the tap, a tubular guide for supplying blanks to said chuck, means for imparting relative longitudinal movement between said chuck and tap whereby the blank is threaded, means at the end of said tap adapted to engage and support the end blank in said guide means in a fixed position longitudinally of the tap during the tapping of a blank and to support a blank in a fixed chuck engaging position, said means on said tap adapted to release said blank upon said relative movement between said chuck and tap.

20. In a tapping machine, a vertically disposed tap having a shank, a rotary chuck for blanks to be tapped, means for feeding blanks to the chuck, means for imparting relative longitudinal movement between said chuck and tap whereby the blanks are threaded, and means for supporting the tap comprising a member having an opening surrounding the shank of the tap in spaced relation to permit passage of the blank over the shank through said opening, and a plurality of gripping means in longitudinally spaced relation within said opening and projected therein into gripping relation with the shank and each comprising diametric slidable jaw-members, a rotatable member adapted to have to and fro movement and adapted in one direction of movement to withdraw said jaw-members out of said opening to permit passage of the threaded blank therethrough and in the other direction to project said jaws, and means adapted to impart to and fro movement successively to the rotatable members of the several gripping means.

21. In a tapping machine, a vertically disposed tap having a shank, a rotary chuck for blanks to be tapped, means for feeding blanks to the chuck, means for imparting relative longitudinal movement between said chuck and tap whereby the blanks are threaded, and means for supporting the tap comprising a member having an opening surrounding the shank of the tap in spaced relation to permit passage of the blank over the shank through said opening, and a plurality of gripping means in longitudinally spaced relation within said opening and projected therein into gripping relation with the shank and each comprising diametric slidable jaw-members, a rotatable member adapted to have to and fro movement and adapted in one direction of movement to withdraw said jaw-members out of said opening to permit passage of the threaded blank therethrough and in the other direction to project said jaws, a toothed segment and an arm on said rotatable member, a pinion meshing with said segment and having a tooth portion, and means adapted to successively engage said arm to rotate the rotatable member in one direction, and said tooth portion of the pinion to rotate it in the other direction, said last named means for the several gripping means adapted to operate successively.

22. In a tapping machine, a vertically disposed tap having a shank, a rotary chuck for blanks to be tapped, means for feeding blanks to the chuck, a vertical cam shaft, cam means thereon for opening and closing and raising and lowering said chuck, whereby the blanks are threaded, means for supporting the tap comprising a member having an opening surrounding the shank of the tap in spaced relation to permit passage of the blanks over the shank through said opening, and a plurality of gripping means in longitudinally spaced relation within said opening and projected therein into gripping relation with the shank, means adapted to be operated to withdraw and project said gripping means to permit passage of the threaded blank through the opening, and cam means on said cam shaft adapted to successively operate said last-named means.

23. In a tapping machine, a vertically disposed tap, a rotary chuck for blanks to be tapped, a hopper for blanks, a vertically disposed tubular guide extending from said hopper to said chuck and adapted to feed tubular blanks by gravity to said chuck and engaging and guiding said blanks exteriorly with the bores forming a passage coaxial with the tap, means for producing relative longitudinal movement between said chuck and tap whereby said blank is threaded, a cutting oil reservoir beneath said tap, an oil conduit extending from said reservoir to said hopper, and a pump for circulating the oil through said conduit into said hopper, downwardly through and in contact with said bores of the blanks to the tap, and thence to the reservoir whereby said blanks are oiled during their movement through said tubular guide.

Signed at Bridgeport in the county of Fairfield and State of Connecticut this 27th day of December, A. D., 1923.

EMANUEL HENRIKSON.